United States Patent [19]

Shimizume

[11] Patent Number: 5,138,601
[45] Date of Patent: Aug. 11, 1992

[54] DIGITAL INFORMATION SIGNAL REPRODUCING APPARATUS

[75] Inventor: Kazutoshi Shimizume, Kanagawa, Japan

[73] Assignee: Sony Corporation, Japan

[21] Appl. No.: 618,461

[22] Filed: Nov. 27, 1990

[30] Foreign Application Priority Data

Dec. 4, 1989 [JP] Japan .................. 1-314957

[51] Int. Cl.⁵ .................. G11B 20/10; G11B 5/09; G11B 5/86
[52] U.S. Cl. .................. 369/59; 341/144; 360/15
[58] Field of Search .................. 360/32, 36.2, 10.1, 360/10.3, 15; 369/59; 358/339; 341/137, 144, 126

[56] References Cited

U.S. PATENT DOCUMENTS

| 4,580,128 | 4/1986 | Ogita et al. | 341/144 |
| 4,614,934 | 9/1986 | Kobayshi et al. | 341/144 |
| 4,818,996 | 4/1989 | Kimura | 341/144 |
| 4,849,957 | 7/1989 | Suzuki | 369/59 |
| 4,942,565 | 7/1990 | Lagadec | 369/59 |
| 5,012,242 | 4/1991 | Yoshio et al. | 341/144 |

FOREIGN PATENT DOCUMENTS 1-175309 7/1989 Japan .

Primary Examiner—Donald McElheny, Jr.
Assistant Examiner—Jennifer L. Hazard
Attorney, Agent, or Firm—Ronald P. Kananen

[57] ABSTRACT

A digital information signal reproducing apparatus is provided, in which a relative speed between a recording medium in which a digital information signal is recorded and a reproducing device for reproducing the digital information signal from the recording medium is selectively changed. Even when the multiple of the over-sampling digital filter is switched in response to the switching of the relative speed, the frequency characteristic of the analog low-pass filter need not be changed. Thus the circuit arrangement of this digital information signal reproducing apparatus can be simplified.

1 Claim, 2 Drawing Sheets

Frequency Characteristic of Analog Low-Pass Filter

Frequency Characteristic of Analog Low-Pass Filter

Frequency Characteristic of Analog Low-Pass Filter

Frequency Characteristic of Analog Low-Pass Filter

DIGITAL INFORMATION SIGNAL REPRODUCING APPARATUS

BACKGROUND OF THE INVENTION

1. Field of the Invention

The present invention generally relates to a digital playing apparatus for variable input signal clock rate which can be applied to an optical recording and/or reproducing apparatus using an optical disc, a magnetic disc recording and/or reproducing apparatus and a recording and/or reproducing apparatus using a magnetic tape. More particularly, this invention relates to a digital information signal reproducing apparatus which can reproduce the digital information signal while a relative speed between a recording medium and a reproducing device is switched upon reproduction.

2. Description of the Prior Art

In the prior art, a digital audio signal reproduced from a compact disc by an optical reproducing apparatus is converted into an analog audio signal and then this analog audio signal is supplied to a cassette tape recorder, thereby being recorded on a magnetic tape. On the other hand, in a cassette tape recorder, a magnetic tape is transported at a speed twice that of the normal reproduction mode to reproduce a recorded signal and the reproduced signal is recorded on a magnetic tape which is transported at a speed twice that of the normal recording mode, thereby a so-called double speed dubbing being performed.

Therefore, the following optical reproducing apparatus is proposed. That is, a compact disc is rotated at a rotational speed twice that of the normal reproduction mode to reproduce a recorded signal and the reproduced signal is supplied to a cassette tape recorder. Thus, the reproduced signal is recorded on a magnetic tape transported at a speed twice that of the normal recording mode by a cassette tape recorder or the like which is set in the recording mode at a speed twice that of the normal reproduction mode.

This previously-proposed optical reproducing apparatus capable of twice than normal speed reproduction will be described with reference to FIG. 1.

In FIG. 1, it will be seen that a digital audio signal recorded in a compact disc 1 is reproduced by an optical pickup head 2. The compact disc 1 is rotated by some suitable driving means such as a motor and so on though not shown.

A signal processing circuit 3 is adapted to error-correct and EFM (eight-to-fourteen modulation)-demodulate the digital audio signal reproduced from the compact disc 1 by the optical pickup head 2. An input terminal $T_1$ is supplied with a speed control signal which shows the rotational speed of the compact disc 1, such as normal reproduction speed and twice normal speed. The signal processing circuit 3 also controls the switching operation of switches $SW_2$ and $SW_3$ which will be described later. The reproduced digital audio signal from the signal processing circuit 3 is supplied to an L/R separating circuit 6, in which it is separated to provide L (left)-channel and R (right)-channel stereo audio signals. These stereo audio signals of L and R channels are supplied through digital-to-analog (D/A) converters 7 and 8 to analog low-pass filters 12, 13 and 14, 15, respectively.

The L-channel analog audio signal from the D/A converter 7 is filtered out by the analog low-pass filter 12 having a cut-off frequency of 22.05 kHz and the analog low-pass filter 13 having a cut-off frequency of 44.1 kHz and is fed through the switch $SW_2$ to an audio circuit 11 which will be described later.

The R-channel analog audio signal from the D/A converter 8 is filtered out by the analog low-pass filter 14 having a cut-off frequency of 22.05 kHz and the analog low-pass filter 15 having a cut-off frequency of 44.1 kHz and is then fed to the audio circuit 11. The audio circuit 11 amplifies the L-channel and R-channel analog audio signals supplied thereto from the analog low-pass filter 12 or 13 and the analog low-pass filter 14 or 15 through the switches $SW_2$ and $SW_3$ and supplies the thus amplified analog audio signals through output terminals $T_2$ and $T_3$ to speakers (not shown) and so on.

When the compact disc 1 is rotated at normal rotational speed, a sampling, frequency Fs is 44.1 kHz and a frequency band lower than substantially 22.05 kHz is allocated to the band of audio signal and a frequency spectrum of the digital audio signal is represented in FIG. 2A. A hatched portion in FIG. 2A represents the band of audio signal. At that time, the signal processing circuit 3 controls the switches $SW_2$ and $SW_3$ so that they are connected to the sides of the analog low-pass filters 12 and 14. As a result, the L-channel and R-channel analog audio signals containing high frequency components from the D/A converters 7 and 8 are respectively filtered out by the analog low-pass filters 12 and 14, each of which has a frequency characteristic shown in FIG. 2D, and are then fed to the audio circuit 11.

When the compact disc 1 is rotated at a rotational speed twice as high as the normal rotational speed, a, sampling frequency 2Fs becomes 88.2 kHz and the frequency band substantially lower than 44.1 kHz is allocated to the band of audio signal. A frequency spectrum of the digital audio signal at that time is represented in FIG. 2B. A hatched portion in FIG. 2B represents the band of audio signal. At that time, the signal processing circuit 3 controls the switches $SW_2$ and $SW_3$ so that they are connected to the sides of the analog low-pass filters 13 and 15. As a result, the L-channel and R-channel analog audio signals containing high frequency components from the D/A converters 7 and 8 are respectively filtered out by the analog low-pass filters 13 and 15, each of which has a frequency characteristic shown in FIG. 2C and are then fed to the audio circuit 11.

As is clear from the foregoing, if the audio signal reproduced at the speed twice than the normal speed by the above-described optical reproducing apparatus is supplied to the tape recorder so that the reproduced audio signal is recorded on the magnetic tape which is transported at the speed twice the running speed of the normal recording mode, the so-called twice normal speed dubbing can be carried out.

Further, Japanese Patent Laid-Open Gazette No. 1-175309 describes a digital signal processing apparatus in which a digital signal is obtained by changing a desirable sampling frequency and a digital signal is converted to an analog signal and vice versa.

In the optical reproducing apparatus as described above by way of example, when the compact disc is rotated at the normal rotational speed and at the twice than normal rotational speed thereby to reproduce the recorded signal, the L-channel and R-channel analog audio signals require the analog low-pass filters each having a cut-off frequency of 22.05 kHz and the analog low-pass filters each having cut-off frequency of 44.1 kHz, which unavoidably provides a complicated circuit arrangement and an expensive optical reproducing apparatus.

OBJECTS AND SUMMARY OF THE INVENTION

Accordingly, it is an object of the present invention to provide an improved digital information signal reproducing apparatus which can eliminate the aforenoted shortcomings and disadvantages encountered with the prior art.

More specifically, it is an object of the present invention to provide a digital information signal reproducing apparatus in which a frequency characteristic of an analog low-pass filter need not be changed.

It is another object of the present invention to provide a digital information signal reproducing apparatus in which a circuit arrangement can be simplified.

As an aspect of the present invention, a digital information signal reproducing apparatus is comprised of a reproducing device for reproducing a digital information signal from a recording medium in which a digital information signal is recorded, an over-sampling digital filter whose multiple can be selectively changed to N and N ×V (N and V are integers larger than 2) when a relative speed between the record medium and the reproducing device is V and which are supplied with the digital information signal from the reproducing device, a digital-to-analog (D/A) converter supplied with an output from the over-sampling filter, and an analog low-pass filter supplied with an analog information signal from the D/A converter.

The preceding, and other objects, features and advantages of the present invention will be apparent in the following detailed description of an illustrative embodiment to be taken in conjunction with the accompanying drawings, in which like reference numerals are used to identify the same or similar parts in the several views.

DETAILED DESCRIPTION OF THE PREFERRED EMBODIMENT

Figure 1:
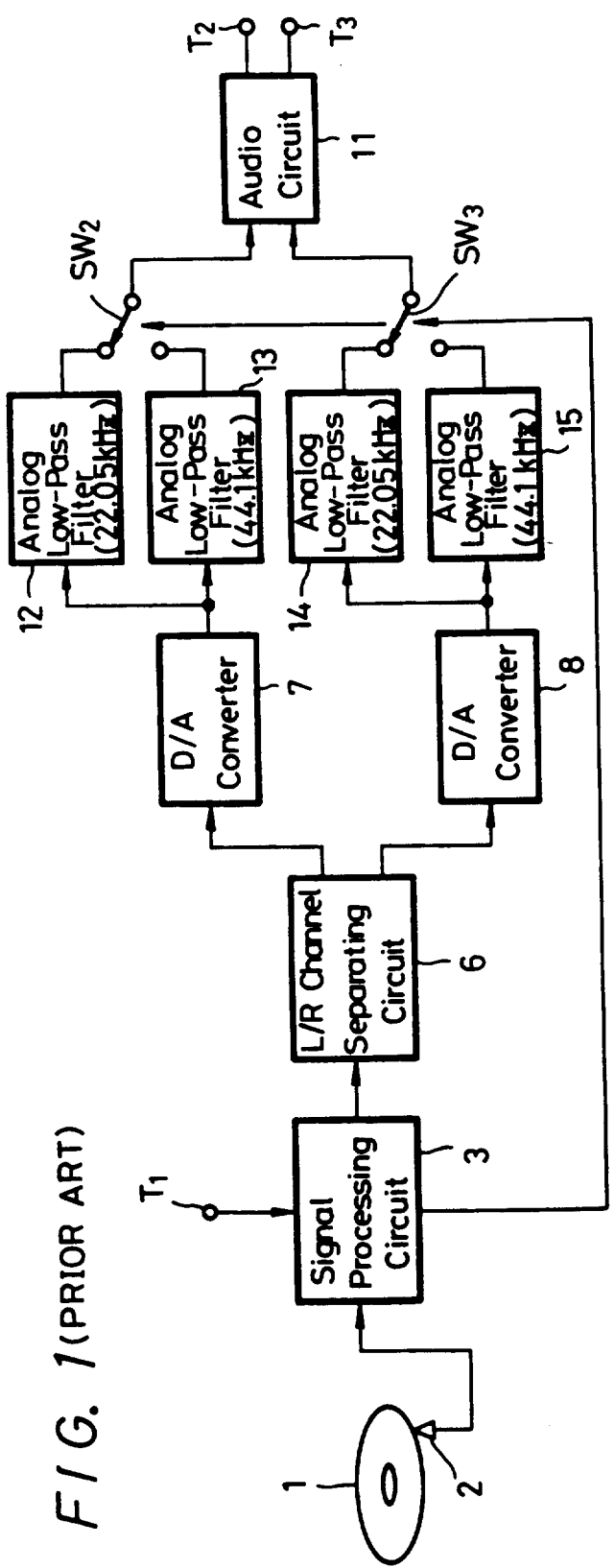
FIG. 1 is a block diagram showing an example of a conventional optical reproducing apparatus which can reproduce a recorded signal at twice the normal speed.
Figure 3:
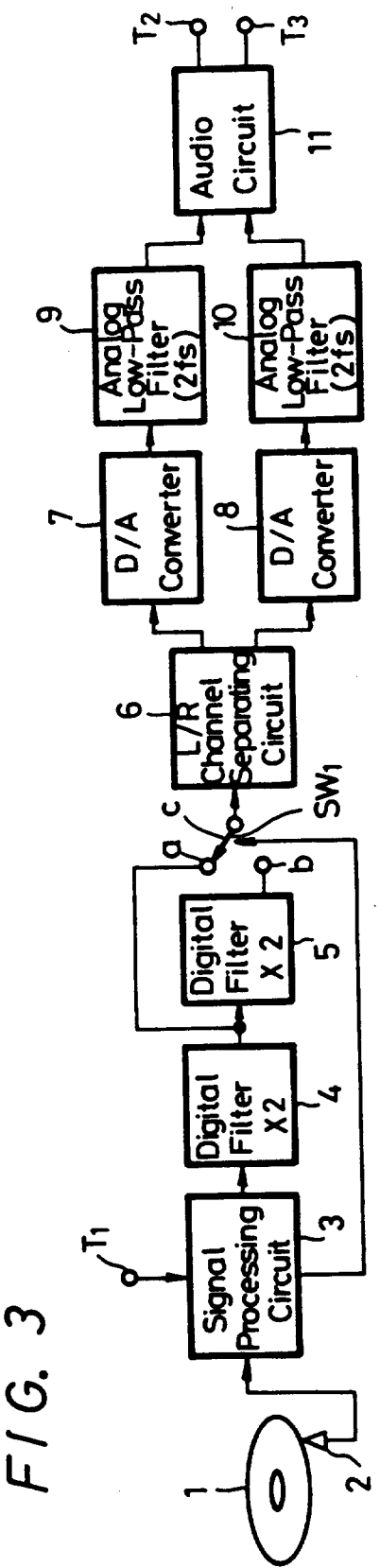
FIG. 3 is a block diagram showing an embodiment of a digital information signal reproducing apparatus according to the present invention.

An embodiment of the digital information signal reproducing apparatus according to the present invention will hereinafter be described with reference to a block diagram forming FIG. 3. In FIG. 3, like parts corresponding to those of FIG. 1 are marked with the same references and therefore need not be described in detail.

Referring to FIG. 3, the digital audio signal is reproduced from the compact disc 1 by the optical pickup head 2, and the reproduced digital audio signal whose sampling frequency is 44.1 kHz is supplied through the signal processing circuit 3 to a digital filter 4. This digital filter 4 is what might be called a twice over sampling digital filter and therefore increases the sampling frequency, 44.1 kHz of the reproduced digital audio signal twice, that is, 88.2 kHz by using an interpolation process in an equivalent fashion.

Another digital filter 5 is also a twice over sampling digital filter and is connected to the next stage of the digital filter 4. The function of the digital filter 5 is exactly the same as that of the digital filter 4 and therefore need not be described herein.

A digital audio signal, which is twice over-sampled by the digital filter 4, is supplied to a fixed contact a of a switch $SW_1$, and a digital audio signal, which is four times over-sampled, is supplied from the digital filter 5 to a fixed contact b of the switch $SW_1$. A movable contact c of the switch $SW_1$ has its position changed according to a control signal from the signal processing circuit 3.

The twice or four times over-sampled digital audio signal is supplied to the L/R separating circuit 6, in which it is separated to provide L-channel and R-channel digital audio signals. These L-channel and R-channel digital audio signals are converted into L-channel and R-channel analog audio signals by the D/A converters 7 and 8, respectively.

Analog low-pass filters 9 and 10 are provided, each of which has a cut-off frequency twice the sampling frequency, 44.1 kHz, that is, 88.2 kHz. The L-channel and R-channel analog audio signals from the D/A converters 7 and 8 are respectively supplied to the analog low-pass filters 9 and 10, in which high frequency components higher than 88.2 kHz thereof are removed and are fed through the audio circuit 11 to the output terminals $T_2$ and $T_3$.

An operation of the embodiment shown in FIG. 3 will be described with reference to FIGS. 4A -4F.

Figure 4A:
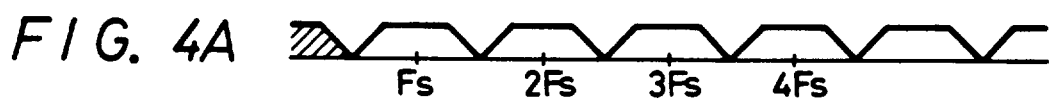
FIGS. 4A -4F are diagrams of frequency spectra of twice than normal speed reproduction and normal speed reproduction, and to which reference will be made in explaining an operation of the digital information signal reproducing apparatus of the present invention, respectively.
Figure 4B:
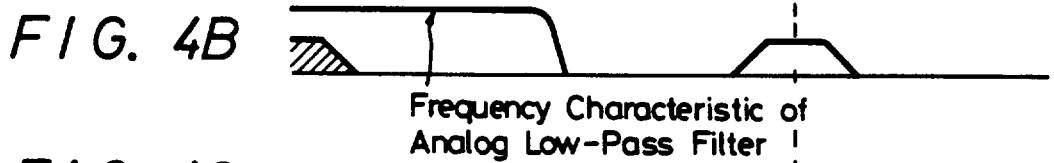
Figure 4C:
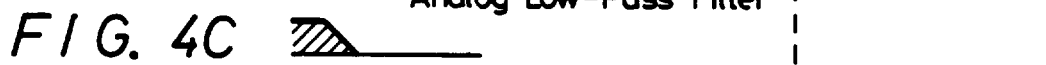

FIG. 4A shows a frequency spectrum of the digital audio signal in the normal speed reproduction mode and a hatched portion in FIG. 4A represents the band of the audio signal. In a normal speed reproduction mode, the digital audio signal from the signal processing circuit 3 is filtered out by the digital filters 4 and 5 so that the sampling frequency Fs (44.1 kHz) thereof is increased four times, that is, 4Fs. Then, the analog audio signals from the D/A converters 7 and 8 are respectively filtered out by the analog low-pass filters 9 and 10, each having the cut-off frequency, 88.2 kHz and having a frequency characteristic shown in FIG. 4B. Thus, the audio circuit 11 is supplied with analog audio signals whose bands are substantially lower than 22.05 kHz.

Figure 4D:
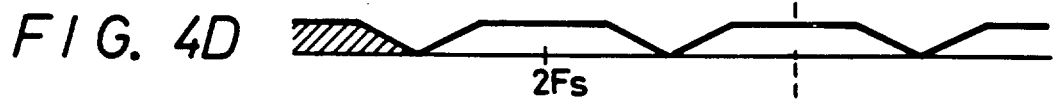
Figure 4E:
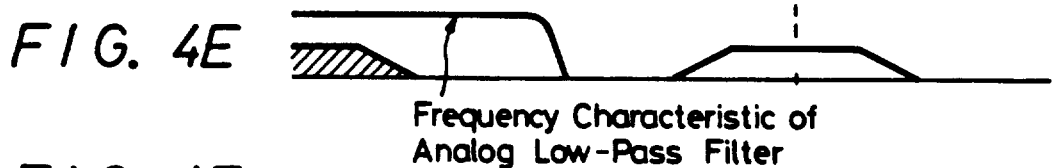
Figure 4F:
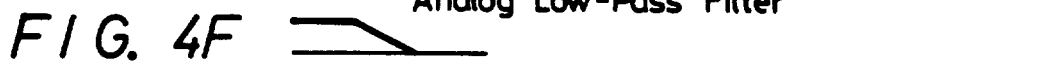

FIG. 4D shows a frequency spectrum of a digital audio signal in the twice normal speed reproduction mode and a hatched portion in FIG. 4D represents the band of audio signal. Upon twice than normal speed reproduction mode, the digital audio signal from the signal processing circuit 3 is filtered out by the digital filter 4 and the sampling frequency thereof is increased twice the sampling frequency of 44.1 kHz. Accordingly, the analog audio signals from the D/A converters 7 and 8 are filtered out by the analog low-pass filters 9 and 10 as shown in FIG. 4E, and the audio circuit 11 is supplied with analog audio signals whose bands are substantially lower than 44.1 kHz as shown in FIG. 4F.

It may be considered that there is provided a single twice over-sampling digital filter and with a normal speed reproduction mode a digital audio signal is filtered out by that twice over-sampling sampling digital filter. In comparison, in the twice than normal speed reproduction mode, such twice over-sampling digital filter is by-passed. The digital filter is generally designed according to a DSP (digital signal processing) method. Therefore, the digital filter of the next stage can be by-passed with ease.

Figure 2A:
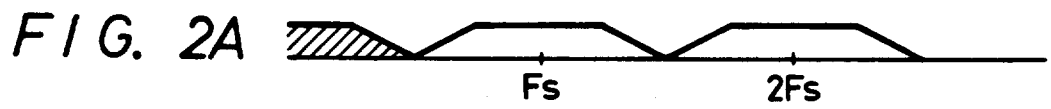
FIGS. 2A -2E are diagrams of frequency spectrum showing a relationship between reproduction speeds and analog low-pass filters, respectively.
Figure 2B:
Figure 2C:
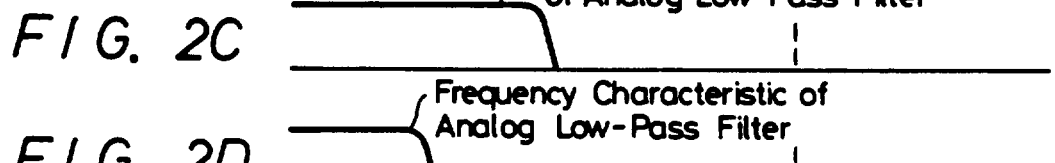
Figure 2D:
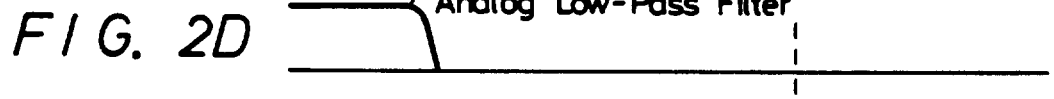
Figure 2E:

More precisely, in the normal speed reproduction mode, the digital audio signal shown in FIG. 2A is filtered out by the digital filter as shown in FIG. 2E, whereby the sampling frequency, 44.1 kHz is increased twice. In the twice than normal speed reproduction mode, the band of the digital audio signal is presented as shown in FIG. 2B. Accordingly, it is sufficient to provide one analog low-pass filter whose cut-off frequency is 44.1 kHz as shown in FIG. 2C. However, in that case, particularly in the twice than normal speed reproduction mode (see FIGS. 2B and 2C), a spacing between the band interrupted by the analog low-pass filter and the band through which the analog audio signal is passed is very small as shown by the hatched areas in FIGS. 2B and 2C. Thus, the analog low-pass filter must have a flat frequency characteristic in the frequency band lower than 44.1 kHz and must keep an attenuating amount corresponding to the dynamic range, for example, the attenuating amount higher than 97 to 8 dB, in the signal interrupting band higher than 44.2 kHz.

The digital information signal is not limited to the digital audio signal and may be a digital video signal and so on.

Further, in the embodiment of FIG. 3, the digital filter 5 may be a twice over-sampling digital filter and the digital filter 4 may be a four time over-sampling digital filter and these digital filters may be selectively switched.

According to the present invention, as described above, a digital information signal reproducing apparatus is comprised of a reproducing device for reproducing the digital information signal from a recording medium in which a digital information signal is recorded, an over-sampling digital filter whose multiple can be selectively changed to N and N ×V (N and V are integers larger than 2) when a relative speed between the recording medium and the reproducing device is V and which is supplied with the digital information signal from the reproducing device, a digital-to-analog (D/A) converter supplied with the output from the over-sampling filter, and an analog low-pass filter supplied with the analog information signal from the D/A converter. Thus, even when the multiple of the over-sampling digital filter is switched in response to the change of relative speed between the record medium and the reproducing device, the frequency characteristic of the analog low-pass filter need not be changed. Therefore, the circuit arrangement of the digital information signal reproducing apparatus can be simplified.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claim.

I claim as my invention:

1. A digital information signal reproducing apparatus comprising:
   (a) reproducing means for reproducing a digital information signal from a recording medium in which a digital information signal is recorded;
   (b) an over-sampling digital filter whose multiple can be selectively changed between N and N ×V (N and V are integers larger than 2) when a relative speed between said recording medium and said reproducing means is V and which are supplied with said digital information signal from said reproducing means;
   (c) a digital-to-analog (D/A) converter supplied with an output from said over-sampling filter; and
   (d) an analog low-pass filter supplied with an analog information signal from said D/A converter.

* * * * *